United States Patent
Woon et al.

(10) Patent No.: US 10,876,441 B2
(45) Date of Patent: Dec. 29, 2020

(54) TAPPET

(71) Applicants: OTICS CORPORATION, Nishio (JP); KUBOTA CORPORATION, Osaka (JP)

(72) Inventors: Hon Chung Woon, Nishio (JP); Masayasu Takami, Sakai (JP)

(73) Assignees: OTICS CORPORATION, Nishio (JP); KUBOTA CORPORATION, Osaka (JP)

(*) Notice: Subject to any disclaimer, the term of this patent is extended or adjusted under 35 U.S.C. 154(b) by 0 days.

(21) Appl. No.: 16/483,123

(22) PCT Filed: Jan. 26, 2018

(86) PCT No.: PCT/JP2018/002422
§ 371 (c)(1),
(2) Date: Aug. 2, 2019

(87) PCT Pub. No.: WO2018/147092
PCT Pub. Date: Aug. 16, 2018

(65) Prior Publication Data
US 2020/0025045 A1    Jan. 23, 2020

(30) Foreign Application Priority Data

Feb. 10, 2017 (JP) .................. 2017-022819
Feb. 10, 2017 (JP) .................. 2017-022820

(51) Int. Cl.
*F01M 9/10* (2006.01)
*F01L 1/14* (2006.01)
(Continued)

(52) U.S. Cl.
CPC ............... *F01M 9/101* (2013.01); *F01L 1/14* (2013.01); *F01L 1/146* (2013.01); *F01L 1/245* (2013.01);
(Continued)

(58) Field of Classification Search
CPC .......... F01M 9/101; F01M 9/10; F01M 9/104; F01L 1/146; F01L 1/245; F01L 1/14; F01L 13/0005; F16H 53/06
(Continued)

(56) References Cited

U.S. PATENT DOCUMENTS 6,688,266 B1 * 2/2004 Church .................. F01L 1/146
                                                   123/90.16
8,316,809 B1   11/2012 Patterson et al.
(Continued)

FOREIGN PATENT DOCUMENTS

CN    2502012 Y    7/2002
CN   105874174 A   8/2016
(Continued)

OTHER PUBLICATIONS

DE-102013222829, Date:May 2015, english language machine translation (Year: 2015).*
(Continued)

*Primary Examiner* — Patrick Hamo
*Assistant Examiner* — Wesley G Harris
(74) *Attorney, Agent, or Firm* — Smith, Gambrell & Russell, LLP

(57) ABSTRACT

Provided is a tappet capable of supplying lubricating oil to a cam even when provided with a lash adjuster.

A tappet (10) includes: a lash adjuster (11) having a plunger (14) and a body (13) in which the plunger (14) is housed so as to be vertically movable, wherein the plunger (14) has a top portion (16) against which a lower end portion of a push rod (88) slidably abuts; and a tappet body (12) which has an assembly hole (45) in which the body (13) is inserted, has a cup-like shape, and has a lower surface portion (27) which slidingly contacts a cam (70). The tappet body (12) has an
(Continued)

oil guide passage (30) extending so as to guide lubricating oil from the push rod (88) side to the cam (70).

20 Claims, 10 Drawing Sheets

(51) Int. Cl.
    *F01L 1/245*     (2006.01)
    *F16H 53/06*     (2006.01)
    *F01L 13/00*     (2006.01)

(52) U.S. Cl.
    CPC ........... *F01L 13/0005* (2013.01); *F01M 9/10* (2013.01); *F01M 9/104* (2013.01); *F16H 53/06* (2013.01)

(58) Field of Classification Search
    USPC ..................... 123/90.55, 90.35, 90.48, 90.52
    See application file for complete search history.

(56) References Cited

U.S. PATENT DOCUMENTS 9,739,181 B2     8/2017     Ozawa
2006/0005797 A1 *     1/2006     Schubeck ............... F01L 1/146
                                                             123/90.48
2017/0044937 A1     2/2017     Ozawa

FOREIGN PATENT DOCUMENTS

| DE | 102013222829 A1 * | 5/2015 | ............ F01L 1/2405 |
|----|-------------------|--------|--------------------------|
| JP | 58-163613 U | 10/1983 | |
| JP | H04-117125 U | 10/1992 | |
| JP | 10-169415 A | 6/1998 | |
| JP | 2018-35710 A | 3/2018 | |

OTHER PUBLICATIONS

International Search Report for PCT/JP2018/002422, dated Mar. 6, 2018 in English and Japanese Language (4 pgs.).

International Preliminary Examination Report for PCT/JP2018/002422, dated Sep. 12, 2018 in Japanese Language (10 pgs.).

Korean Office Action dated Oct. 12, 2020 relative to Korean patent application 10-2019-7025208, 5 pages (with machine translation, 6 pages).

Chinese Office Action dated Sep. 30, 2020 relative to Chinese patent application 201880011134.X, 6 pages (with machine translation, 8 pages).

\* cited by examiner

TAPPET

TECHNICAL FIELD

The present invention relates to a tappet.

BACKGROUND ART

Patent Literature 1 discloses a tappet constructed as a valve lifter. The tappet has a cup-like shape as a whole, and a lower end portion of a push rod abuts and is supported on an inner bottom portion of the tappet. An upper end portion of the push rod supports an end of a rocker arm. The other end of the rocker arm abuts on an upper end portion of an exhaust valve.

A lower surface of the tappet is a flat sliding contact surface and is in contact with a cam. When the cam rotates, the tappet and the push rod are raised and lowered, and accordingly, the rocker arm swings to open and close the exhaust valve.

CITATIONS LIST

Patent Literature

Patent Literature 1: JP-A-10-169415

SUMMARY OF INVENTION

Technical Problems

An automatic adjustment function for valve clearance can be exhibited by incorporating a lash adjuster into a cap of the tappet. This type of lash adjuster includes a cylindrical body and a plunger housed in the body, and the plunger is configured to move vertically with respect to the body in response to fluctuation of hydraulic pressure.

The present invention has been completed based on the above circumstances, and it is an object of the present invention to provide a tappet which includes a lash adjuster and in which assembling operation can be easily performed.

Solutions to Problems

A tappet of the present invention includes a lash adjuster and a tappet body into which the lash adjuster is inserted and incorporated. The lash adjuster has a plunger having a top portion on which a lower end portion of a push rod is slidable, and a body in which the plunger is housed so as to be vertically movable. The tappet body has: a lower surface portion which slidingly contacts a cam; an outer peripheral surface portion which is slidable on a tappet guide; a receiving surface portion which is located inside the outer peripheral surface portion, receives lubricating oil, and faces upward; an assembly hole which is located inside the outer peripheral surface portion, extends vertically, and has an upper end opened to the receiving surface portion and a lower end closed, and in which the body is inserted and assembled; and a receiving space which is located inside the outer peripheral surface portion and opened to an upside of the receiving surface portion.

Advantageous Effects of Invention

Since the lash adjuster is merely inserted into the assembly hole of the tappet body, assembling operation can be easily performed, and, in addition, the existing (general-purpose) lash adjuster can be used as it is.

Furthermore, a predetermined amount of the lubricating oil can be stored in the receiving space above the receiving surface portion inside the tappet body.

In the present invention and the present description, the "vertically" or "vertical direction" is not limited to a strict vertical direction, but includes a direction inclined with respect to the vertical direction.

DESCRIPTION OF EMBODIMENTS

Figure 1:
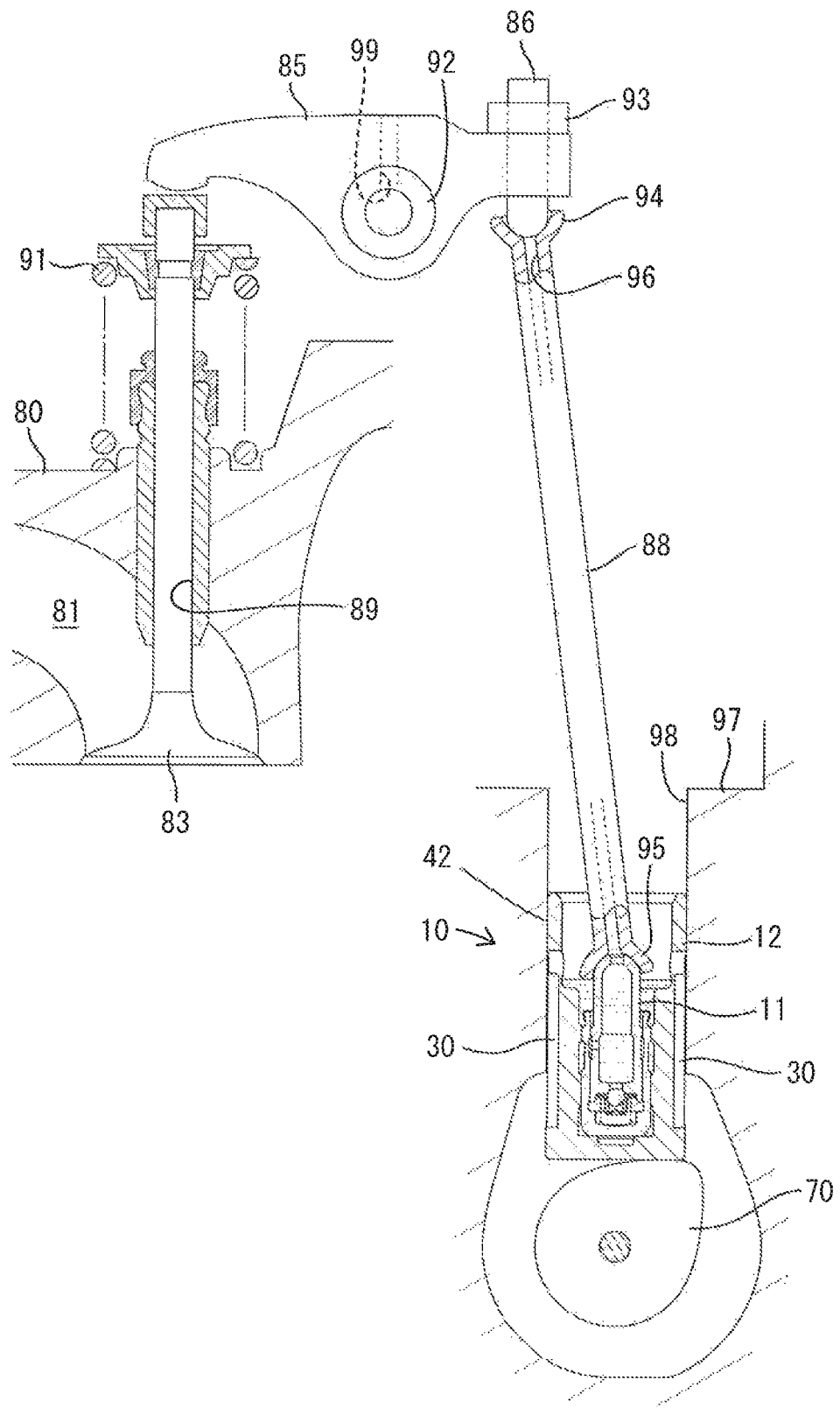
FIG. 1 is a cross-sectional view of a valve gear including a tappet of Embodiment 1 of the present invention.

Preferred embodiments of the present invention are shown below.

The oil guide passage may have an oil guide groove extending vertically in the outer peripheral surface portion. According to this, lubricating oil from a push rod can reach a cam quickly and reliably along the oil guide groove. Furthermore, since the oil guide groove is arranged at an outer peripheral surface portion of a tappet body, ease of machining can be ensured.

The tappet body may preferably have an oil guide hole which penetrates a peripheral wall defining an outer periphery of the receiving space and communicates with an upper end portion of the oil guide groove. According to this, the lubricating oil can flow from the receiving space to the oil guide groove through the oil guide hole. Therefore, the lubricating oil can be prevented from overflowing from an upper end of the tappet body.

The oil guide passage may preferably have a circumferential groove which is provided in a lower end portion of the outer peripheral surface portion, extends circumferentially and communicates with a lower end portion of the oil guide groove. According to this, even if the tappet body rotates and the oil guide groove is displaced to a position deviated from a sliding region of the cam, the lubricating oil can be spread from the oil guide groove along the circumferential groove and can reach the cam.

A lower surface of the circumferential groove may preferably be a downslope which is inclined downward from an inner surface of the circumferential groove toward outside. According to this, the lubricating oil can smoothly and quickly reach the cam along the downslope of the circumferential groove.

The tappet body may preferably have a retaining portion for retaining the lubricating oil inside the circumferential groove. According to this, since the lubricating oil is temporarily received by the retaining portion and then can be released toward the cam, the reliability of causing the lubricating oil to reach the cam can be enhanced.

The tappet body may preferably have a baffle portion which is provided on a lower surface of the circumferential groove and inclined upward from the inner surface of the circumferential groove toward outside, and the retaining portion may be constituted by the baffle portion. According to this, the retaining portion can be provided without increasing the number of parts.

The retaining portion may preferably be constituted by a ring member which is attached to the tappet body so as to cover an opening of the circumferential groove. According to this, it is possible to adjust an amount of the lubricating oil retained in the circumferential groove, the position where the lubricating oil is released to the cam, and the like, by the form of the ring member.

The oil guide passage may preferably have a communication hole penetrating an outer peripheral portion of the assembly hole of the tappet body from a side surface of the assembly hole to the outer peripheral surface portion. According to this, the lubricating oil can be caused to flow between the assembly hole and the outer peripheral surface portion via the communication hole. Furthermore, when the lash adjuster is inserted into the assembly hole of the tappet body, air (compressed air) in the assembly hole can be vented through the communication hole.

Embodiment 1

Embodiment 1 of the present invention will be described with reference to FIGS. 1 to 3. A tappet 10 according to Embodiment 1 is provided in a valve gear of an internal combustion engine, and illustrates a valve lifter of an OHV type engine.

As shown in FIG. 1, the valve gear includes: a valve 83 which is incorporated so as to be able to open and close an intake or exhaust port 81 of the cylinder head 80 and has an upper end portion disposed protruding above the cylinder head 80; a rocker arm 85 having one lengthwise end portion which abuts against the upper end portion of the valve 83; a push rod 88 having an upper end portion which abuts against the other lengthwise end portion of the rocker arm 85 via an adjusting screw 86; a lash adjuster 11 against which a lower end portion of the push rod 88 abuts; and a tappet body 12 housing the lash adjuster 11. Among these, the tappet 10 is constituted of the lash adjuster 11 and the tappet body 12.

The valve 83 is inserted through a valve guide hole 89 so as to be vertically slidable, and is biased in a valve closing direction (a direction for lifting one end portion of the rocker arm 85) by a biasing member 91 such as a coil spring.

The rocker arm 85 is swung with a rocker shaft 92 serving as a fulcrum which penetrates a lengthwise middle portion (a portion between lengthwise one end portion and the other end portion) of the rocker arm 85, thereby performing the function of opening and closing the valve 83. The adjusting screw 86 penetrates the other lengthwise end portion of the rocker arm 85 and is screwed into a nut 93, and an amount of downward protrusion thereof from the other end portion of the rocker arm 85 is adjustable according to screwing into the nut 93.

The push rod 88 is a rod-like member elongated vertically, and is housed in a rod housing portion (not shown). The upper end portion of the push rod 88 is a hemispherical upper end recess 94 opened upward. A lower end portion of the adjusting screw 86 is slidably supported on the upper end recess 94. The lower end portion of the push rod 88 is a hemispherical lower end recess 95 opened downward. The lower end recess 95 is slidably supported on a top portion 16 of a plunger 14, to be described later, of the lash adjuster 11.

A rod hole 96 is provided in a center of the push rod 88 so as to penetrate in the axial direction. An upper end of the rod hole 96 is opened at a central portion of the upper end recess 94, and a lower end of the rod hole 96 is opened at a central portion of the lower end recess 95. Here, lubricating oil (hydraulic oil) supplied to the rocker arm 85 flows from a sliding region of the adjusting screw 86 into the rod hole 96 through the upper end recess 94, and descends along an inner surface of the rod hole 96 to reach the lower end recess 95, and lubricates the top portion 16 of the plunger 14 sliding on the lower end recess 95. Further, a part of the lubricating oil flows down along an outer surface of the push rod 88 from the upper side where the rocker arm 85 is located, and reaches the tappet 10.

Next, the tappet 10 will be described. As shown in FIG. 2, the lash adjuster 11 constituting the tappet 10 includes a bottomed cylindrical body 13 and the bottomed cylindrical plunger 14 inserted in the body 1 so as to be vertically movable. The plunger 14 has a valve hole 15 in a bottom wall portion thereof and has the hemispherical top portion 16 at an upper end portion of a peripheral wall portion thereof. A radius of curvature of an outer peripheral surface (convex spherical surface) of the top portion 16 is smaller than a radius of curvature of an inner peripheral surface (concave spherical surface) of the lower end recess 95. The center of the top portion 16 is provided with a top hole 17 penetrating therethrough.

The inside of the plunger 14 is constituted as a low pressure chamber 18. The lower side of the inside of the body 13 is constituted as a high pressure chamber 19 defined between the lower side and the bottom wall portion of the plunger 14. The lubricating oil is introduced from the rod hole 96 of the push rod 88 through the top hole 17 and stored in the low pressure chamber 18. The lubricating oil of the low pressure chamber 18 is filled into the high pressure chamber 19 through the valve hole 15.

The high pressure chamber 19 houses a spherical valve body 21, a cage-shaped retainer 22, a first spring 23 and a second spring 24. The valve body 21 is housed in the retainer 22 and disposed so as to be able to open and close the valve hole 15. The first spring 23 is housed in the retainer 22 and biases the valve body 21 upward (in a direction for closing the valve hole 15). The second spring 24 biases the retainer 22 upward. In Embodiment 1, the known lash adjuster 11 is used as it is.

The tappet body 12 has a cup-like shape as a whole and includes a circular bottom wall 25 and a peripheral wall 26 rising upward from an outer peripheral edge of the bottom wall 25. The tappet body 12 is inserted into a tappet guide hole 98 provided in a housing 97 at an upper portion of a cylinder block, and is inserted to be vertically slidable.

Specifically, the tappet body 12 has: an outer peripheral surface portion 42 constituting an outer peripheral surface of the peripheral wall 26; a lower surface portion 27 constituting a lower surface of the bottom wall 25; a receiving surface portion 43 provided inside the outer peripheral surface portion 42 and located at the same height as a vertically middle portion of the outer peripheral surface portion 42 and facing upward; and a receiving space 44 provided inside of an upper portion of the outer peripheral surface portion 42 and opened to the upside of the receiving surface portion 43. In other words, the receiving space 44 is partitioned by an upper portion of the peripheral wall 26 and the receiving surface portion 43. The lower surface portion 27 is a flat surface disposed substantially horizontally. The receiving surface portion 43 also has a portion disposed substantially horizontally. The outer peripheral surface portion 42 is formed to have a circular cross section and is slidable on an inner peripheral surface of the tappet guide hole 98.

Figure 2:
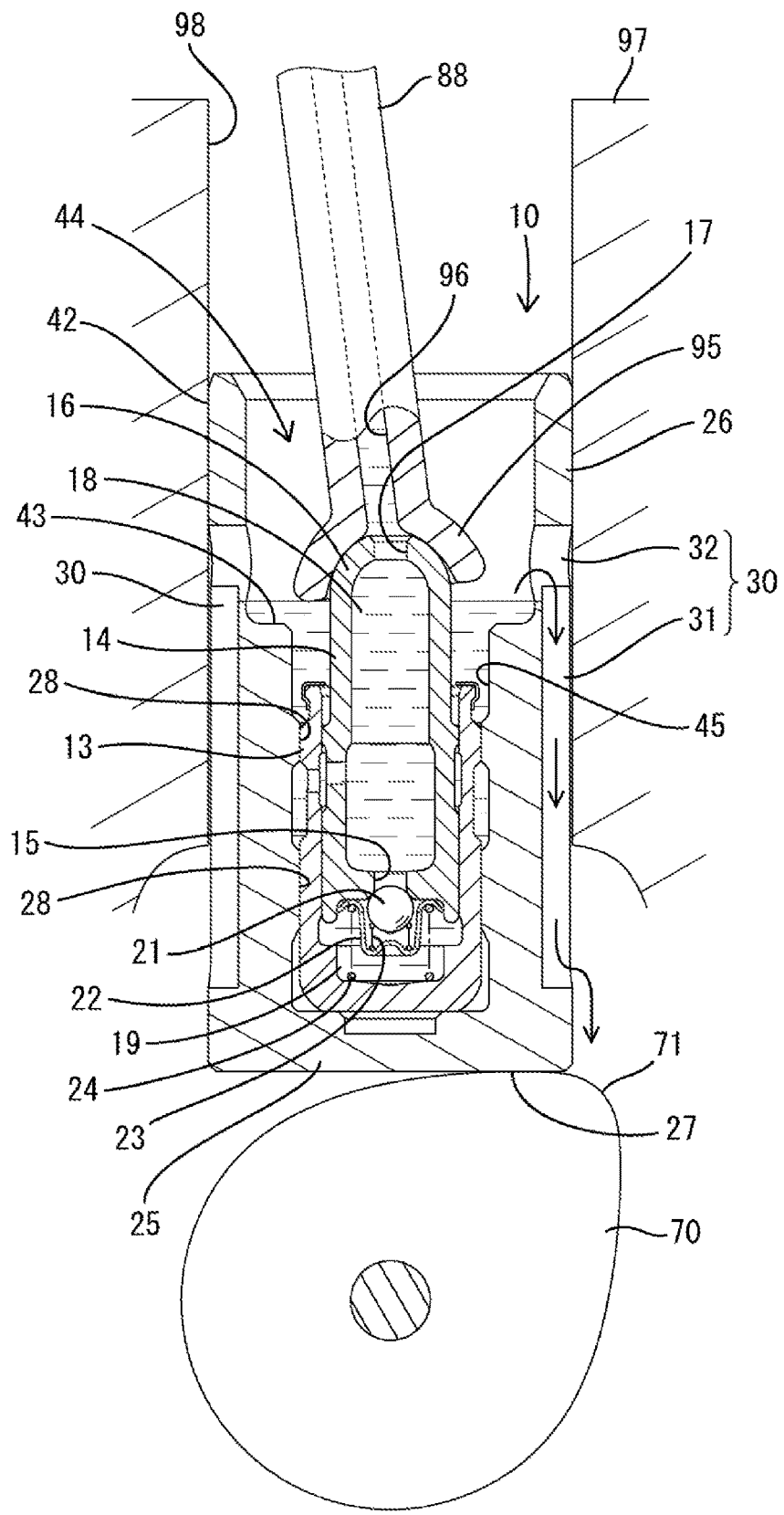
FIG. 2 is a cross-sectional view of the tappet.

As shown in FIG. 2, the tappet body 12 has an assembly hole 45 which extends vertically and has a circular cross section. The assembly hole 45 has an upper end which is opened to a radially central portion of the receiving surface portion 43 and a lower end which is closed and defines an upper surface of the bottom wall 25. The lash adjuster 11 is inserted from the receiving space 44 side into the assembly hole 45 of the tappet body 12 and assembled.

The lower surface portion 27 of the tappet body 12 is slidably in contact with a cam 70 disposed below. An inner peripheral surface of the assembly hole 45 of the tappet body 12 includes fitting surfaces 28 which are provided at two positions spaced from each other in the vertical direction and have the smaller diameters than adjacent upper and lower regions. The fitting surface 28 of the tappet body 12 is disposed to be able to abut against the body 13 of the lash adjuster 11 along a circumferential direction. As a result, the lash adjuster 11 is held in a state where a free movement in the radial direction with respect to the tappet body 12 is restricted.

The peripheral wall 26 of the tappet body 12 is provided with an oil guide passage 30 for receiving the lubricating oil flowing down along the outer surface of the push rod 88 and guiding the lubricating oil to the cam 70. In Embodiment 1, the oil guide passage 30 is constituted of an oil guide groove 31 and an oil guide hole 32.

Figure 3:
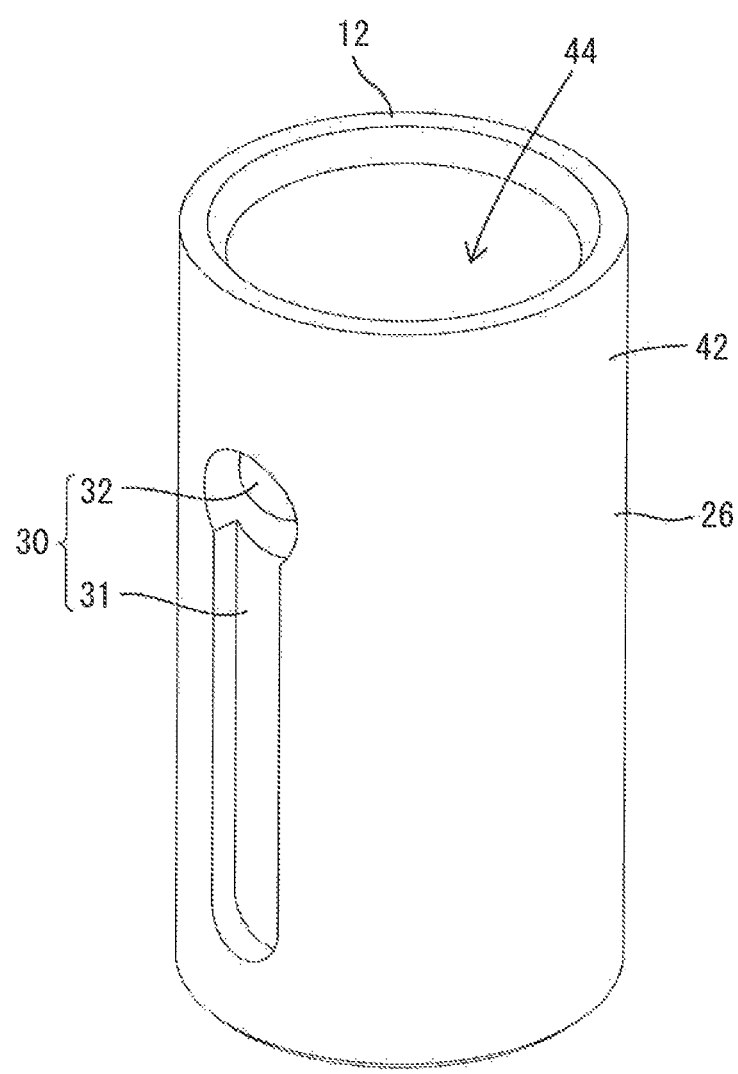
FIG. 3 is a perspective view of a tappet body.

As shown in FIG. 3, the oil guide groove 31 is recessed in the outer peripheral surface portion 42 of the peripheral wall 26 and has a U-shaped cross section or a squared U-shaped cross section extending vertically. The oil guide grooves 31 are formed in pairs at both radial end portions in the outer peripheral surface portion 42 of the peripheral wall 26. As shown in FIG. 2, the oil guide grooves 31 are provided in a thick-walled portion of the peripheral wall 26 outside the assembly hole 45. A lower end of the oil guide groove 31 is closed at the same position as an inner surface of the bottom wall 25 or slightly above the inner surface of the bottom wall 25.

The oil guide hole 32 has a circular cross-sectional shape coaxially penetrating both radial end portions of a thin-walled portion of the peripheral wall 26 from a position facing an inner space to the outer peripheral surface portion 42, and communicates with an upper end portion of the oil guide groove 31. The oil guide hole 32 is located slightly above the receiving surface portion 43. The opening diameter of the oil guide hole 32 is slightly larger than a groove width of the oil guide groove 31. When the tappet body 12 is inserted into the tappet guide hole 98, a portion of the oil guide passage 30 excluding a lower end portion of the oil guide groove 31 is closed by the tappet guide hole 98 so as to face the inner peripheral surface of the tappet guide hole 98. In Embodiment 1, the oil guide hole 32 is formed in the peripheral wall 26 by boring process, and the oil guide groove 31 is formed in the outer peripheral surface portion 42 of the peripheral wall 26 by cut-out process.

Next, a valve gear mechanism will be described. When the cam 70 rotates, the tappet body 12 in contact with the cam 70 is slidingly displaced in the tappet guide hole 98 in the vertical direction, and the push rod 88 is raised and lowered via the lash adjuster 11. The rising and lowering operation of the push rod 88 is transmitted to the rocker arm 85 via the adjusting screw 86, whereby the rocker arm 85 is swung and displaced so that one lengthwise end portion of the rocker arm 85 is moved up and down, with the result that the valve 83 is opened and closed.

Here, when the tappet body 12 is raised and accordingly the plunger 14 is strongly pressed downward from the push rod 88, the valve body 21 closes the valve hole 15 and thereby the plunger 14 and the body 13 are turned into a rigid body, so that lowering of the plunger 14 is restricted. When the tappet body 12 is lowered and accordingly pressure acting on the plunger 14 is reduced, the second spring 24 pushes up the plunger 14 and thereby the volume of the high pressure chamber 19 is increased, so that the pressure of the high pressure chamber 19 is reduced. As a result, a force for biasing the valve body 21 in the valve closing direction is reduced, and the valve body 21 opens the valve hole 15, so that the lubricating oil in the low pressure chamber 18 is transferred to the high pressure chamber 19. Thus, lift force of the cam 70 is attenuated and transmitted to the push rod 88 and the rocker arm 85 via the lash adjuster 11, whereby valve clearance is automatically adjusted.

Next, a lubricating path of the lubricating oil from the rocker arm 85 side to the cam 70 side will be described.

The lubricating oil flowing through an oil passage 99 of the rocker shaft 92 flows to the other lengthwise end portion of the rocker arm 85. A part of the lubricating oil lubricates a lubricating region between the lash adjuster 11 and the adjusting screw 86 and flows into the rod hole 96, and the rest flows down along the outer surface of the push rod 88. The lubricating oil flowing down along the outer surface of the push rod 88 flows from the outer surface of the lower end recess 95 into the inside of the tappet body 12.

The lubricating oil flowing into the inside of the tappet body 12 is received by the receiving surface portion 43 and can be stored in the receiving space 44 until reaching a lower limit height of the oil guide hole 32. In this case, since there is substantially no gap formed between the fitting surface 28 of the tappet body 12 and the body 13, the lubricating oil does not easily pass therethrough.

The lubricating oil stored in the receiving space 44 above the receiving surface portion 43 flows into the oil guide hole 32 and then flows to the upper end portion of the oil guide groove 31, and further slides down from the upper end portion of the oil guide groove 31 along a groove surface of the oil guide groove 31 (see arrows in FIG. 2). However, the lubricating oil may drop from the outer surface of the lower end recess 95 and directly enter the oil guide hole 32 without via the receiving surface portion 43. The lubricating oil reaching the lower end portion of the oil guide groove 31 further drops and adheres to a cam surface 71 of the cam 70, thereby lubricating a sliding region between the lower surface portion 27 of the tappet body 12 and the cam surface 71 of the cam 70.

As described above, according to Embodiment 1, even if the lash adjuster 11 is internally fitted to the tappet body 12 so that the lubricating oil cannot descend inside the tappet body 12 to reach the cam 70 side, the oil guide passage 30 extending from the oil guide hole 32 to the cam 70 side through the oil guide groove 31 is secured. Therefore, sufficient lubricating oil can be supplied to the cam 70.

Since the lash adjuster 11 is merely inserted into the assembly hole 45 of the tappet body 12, assembling operation can be easily performed, and, in addition, the existing (general-purpose) lash adjuster can be used as it is. In addition, a predetermined amount of lubricating oil can be stored in the receiving space 44 above the receiving surface portion 43 inside the tappet body 12.

Furthermore, since the oil guide groove 31 is provided in the outer peripheral surface portion 42 of the tappet body 12, machining becomes easier as compared with a case where the oil guide groove 31 is provided in an inner peripheral surface of the tappet body 12. Furthermore, since the oil guide hole 32 is provided so as to penetrate the peripheral wall 26 of the tappet body 12 to communicate with the upper end portion of the oil guide groove 31, the lubricating oil passes sequentially from the receiving space 44 through the oil guide hole 32 and the oil guide groove 31, and can reach the cam 70 side quickly. In addition, the lubricating oil can be prevented from overflowing from the upper end of the peripheral wall 26 of the tappet body 12 and being spread around the periphery.

Embodiment 2

Figure 4:
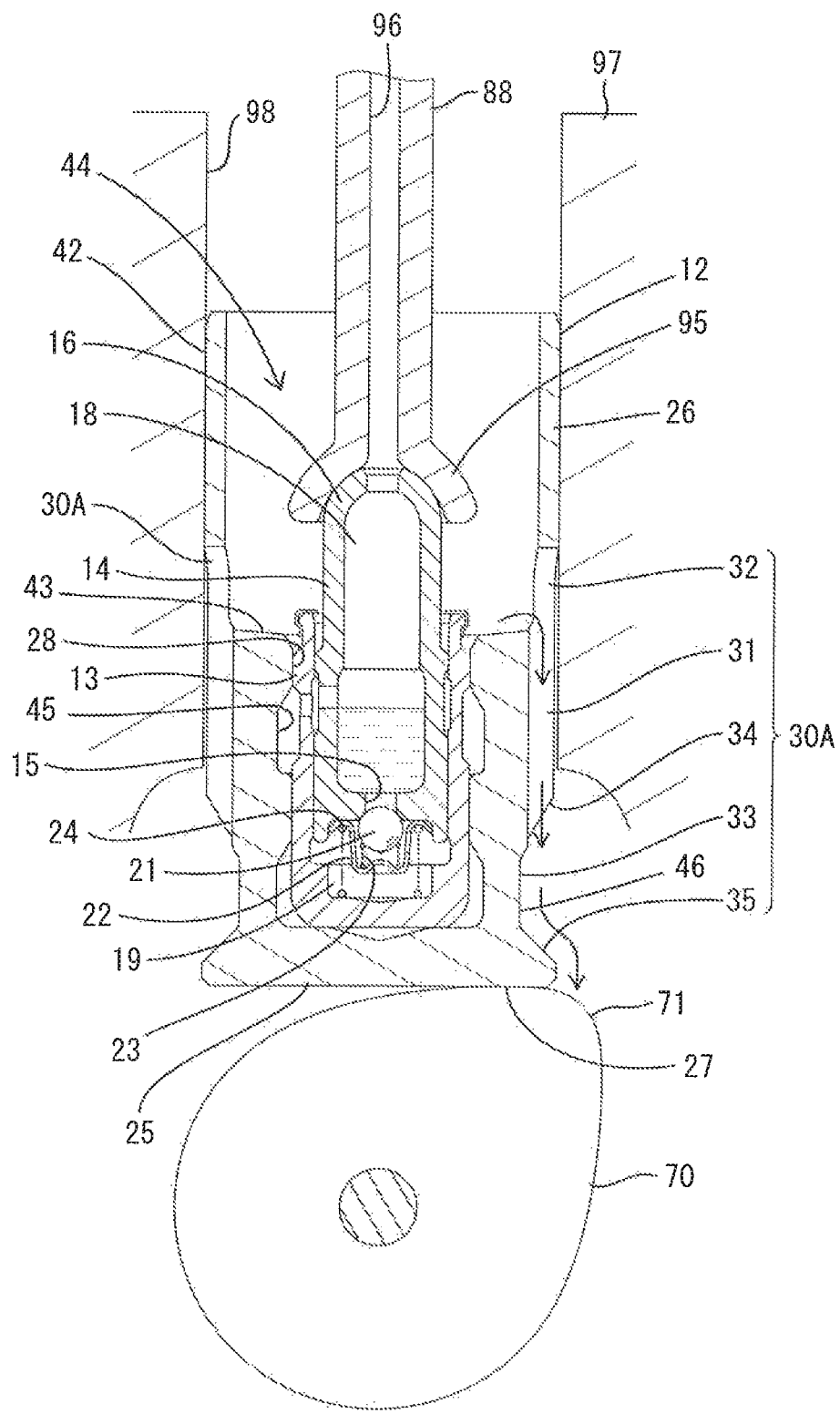
FIG. 4 is a cross-sectional view of a tappet of Embodiment 2.
Figure 5:
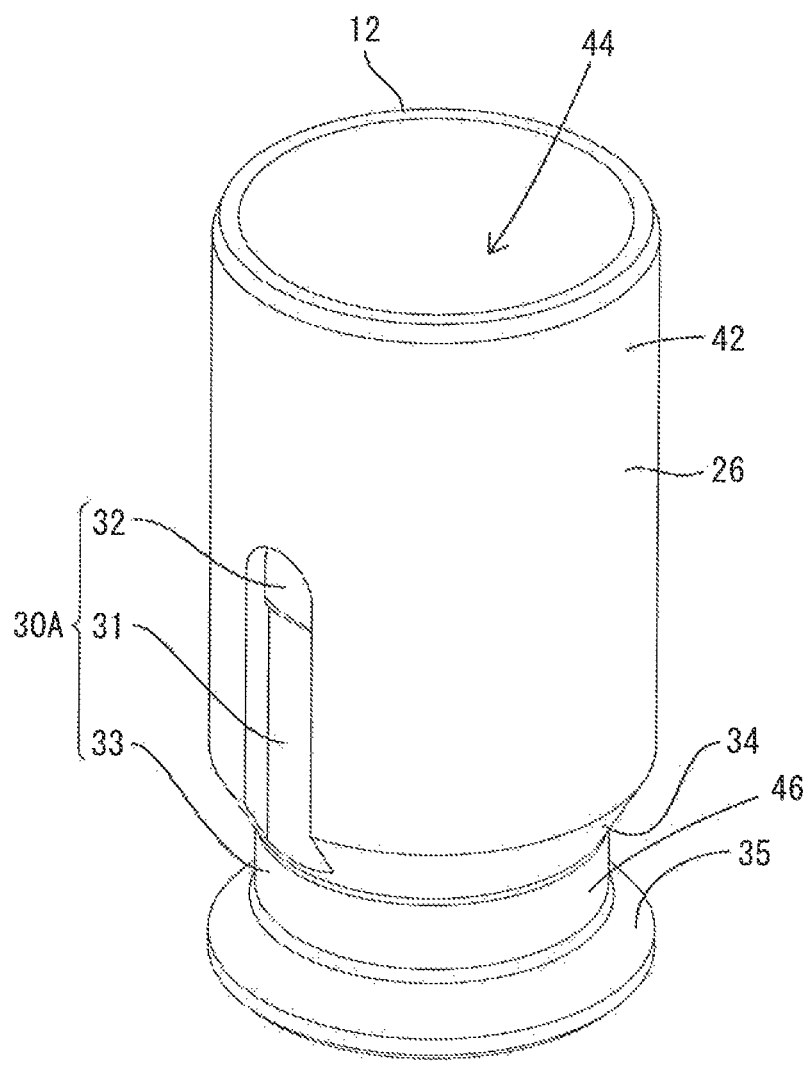
FIG. 5 is a perspective view of a tappet body of Embodiment 2.

FIGS. 4 and 5 show Embodiment 2 of the present invention. Embodiment 2 differs from Embodiment 1 in that an oil guide passage 30A includes a circumferential groove 33. Embodiment 2 is the same as Embodiment 1 except for this point, and the description overlapping with Embodiment 1 is omitted. In the following description, the structurally same or corresponding portions as or to those in Embodiment 1 are denoted by the same reference signs as in Embodiment 1.

The circumferential groove 33 has an annular shape extending over the entire circumference of the outer peripheral surface portion 42 of the tappet body 12 and communicates with the lower end portions of the oil guide grooves 31 at both radial end portions. The depth of the circumferential groove 33 is greater than the depth of the oil guide groove 31 and greater than the thickness of a thin-walled portion of the tappet body 12.

An inner surface 46 of the circumferential groove 33 is disposed along the vertical direction. A lower surface of the circumferential groove 33 is a downslope 35 which is inclined downward from the inner surface 46 toward outside in a tapered shape. An upper surface of the circumferential groove 33 is an upslope 34 which is inclined upward from the inner surface 46 toward outside in a tapered shape. Each of the downslope 35 and the upslope 34 has an inclination angle larger than 45 degrees with respect to a horizontal axis extending along the horizontal direction. The downslope 35 of the circumferential groove 33 faces the lower end of the tappet body 12 and is disposed at a position close to the lower surface portion 27, The upslope 34 of the circumferential groove 33 intersects with the lower end of the oil guide groove 31, and the oil guide groove 31 communicates with the upslope 34 in a cutout manner.

Here, the diameter dimension of the lower surface portion 27 of the tappet body 12 is made larger than the width dimension of the cam surface 71 of the cam 70, and the lower surface portion 27 of the tappet body 12 has a portion protruding outward in the width direction of the cam surface 71 of the cam 70. For this reason, when the tappet body 12 is rotated and displaced around the axis in the tappet guide hole 98, the oil guide groove 31 may be displaced to a position deviated from the cam surface 71 of the cam 70. In this case, there is a concern that the lubricating oil may drop down and cannot flow from the oil guide groove 31 to the cam surface 71 of the cam 70. However, according to Embodiment 2, even if the oil guide groove 31 is displaced to the position deviated from the cam surface 71 of the cam 70 in the circumferential direction, the lubricating oil flows from the lower end of the oil guide groove 31 to the circumferential groove 33, and is spread circumferentially along the groove surface of the circumferential groove 33, so that the spread lubricating oil can reach the cam surface 71 of the cam 70. As a result, sufficient lubricating oil can be supplied to the cam 70. In particular, in Embodiment 2, since the lower surface of the circumferential groove 33 is the downslope 35, the lubricating oil can smoothly and quickly reach the cam surface 71 of the cam 70 from the downslope 35.

Embodiment 3

Figure 6:
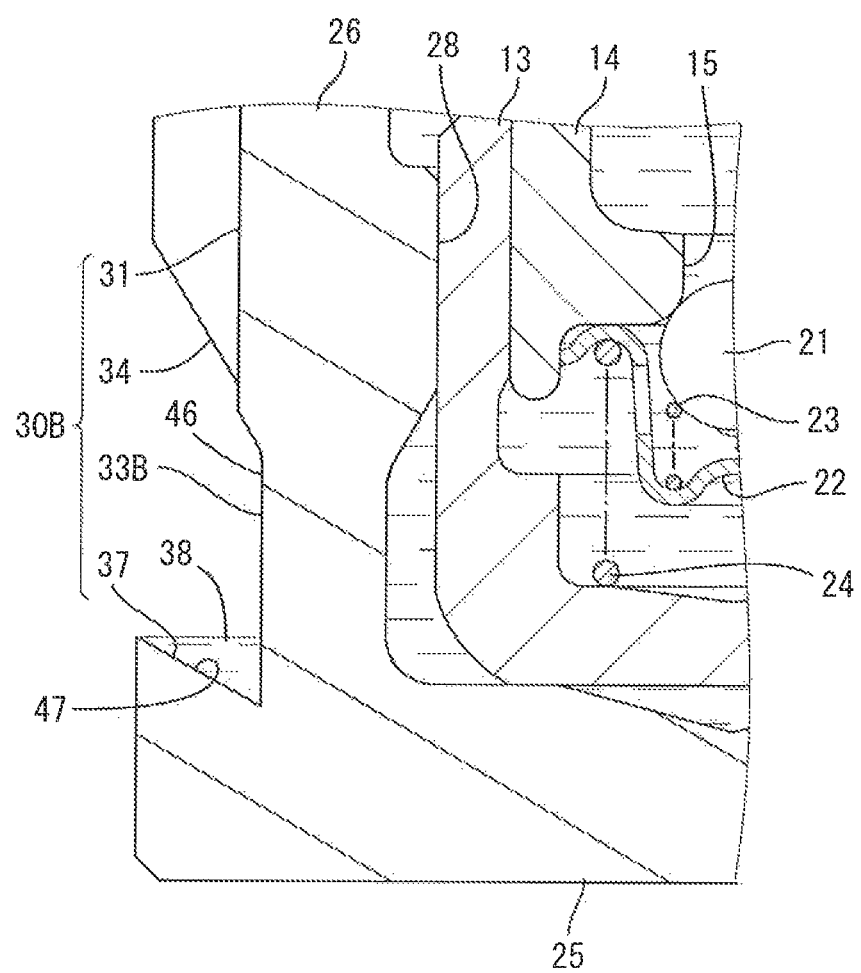
FIG. 6 is a partial enlarged cross-sectional view of a tappet of Embodiment 3.

FIG. 6 shows Embodiment 3 of the present invention. Embodiment 3 differs from Embodiment 2 in the form of a circumferential groove 33B of an oil guide passage 30B, and the tappet body 12 has a retaining portion 47 which temporarily receives lubricating oil from an oil guide groove 31 inside the circumferential groove 33B. The others are the same as in Embodiment 2.

The circumferential groove 33B has a baffle portion 37 having a reverse tapered shape which is formed on the lower surface thereof and is gradually inclined upward from the inner surface 46 toward outside. The baffle portion 37 is formed as an undercut over the entire circumference of the circumferential groove 33B. The retaining portion 47 is constituted by the baffle portion 37, and the lubricating oil can be stored in a retaining space 38 which is defined between the inner surface 46 of the circumferential groove 33B and the baffle portion 37 and has a V-shaped cross section.

According to Embodiment 3, the lubricating oil having dropped from the oil guide groove 31 is temporarily received in the retaining space 38, and the received lubricating oil is spread in the circumferential direction along the baffle portion 37 with the rotation of the tappet body 12, and can reach the cam surface 71 of the cam 70. Therefore, it is possible to enhance the reliability of causing the lubricating oil to reach the cam surface 71 of the cam 70. Furthermore, since the baffle portion 37 serving as the retaining portion 47 is provided integrally with the tappet body 12, the number of parts is not increased, so that parts management becomes easy.

Embodiment 4

Figure 7:
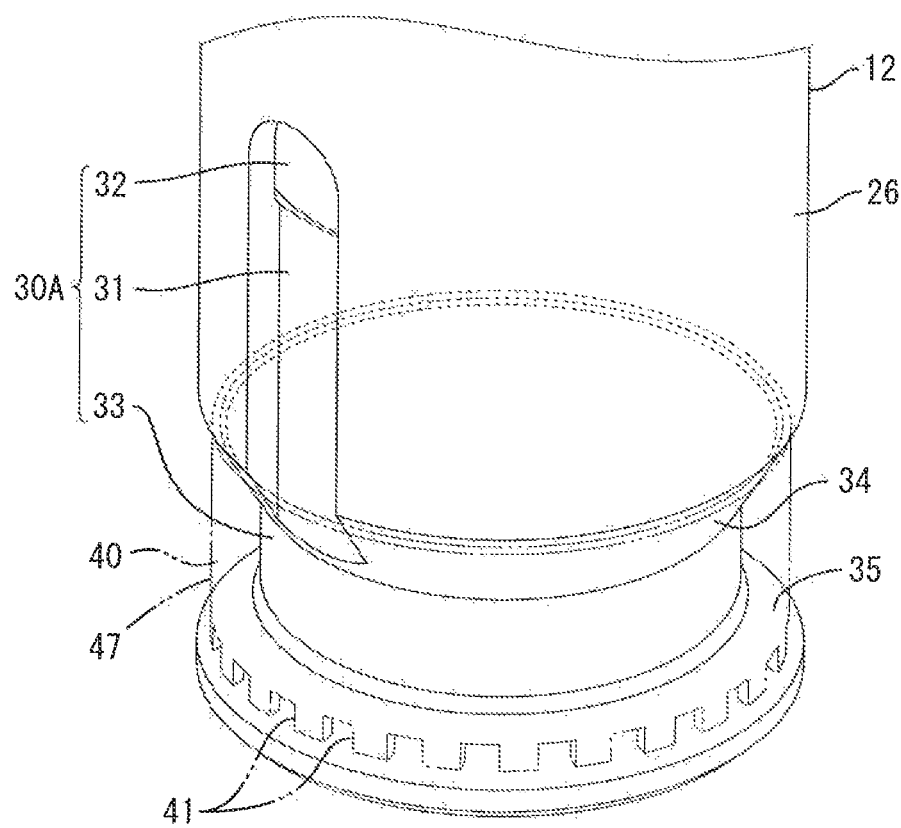
FIG. 7 is a partial enlarged perspective view of a tappet of Embodiment 4.

FIG. 7 shows Embodiment 4 of the present invention. Embodiment 4 differs from Embodiment 2 in that a ring member 40 separate from a tappet body 12 is attached as the retaining portion 47. The others are the same as in Embodiment 2.

The ring member 40 has an annular shape with ends as a whole (C shape in plan view) and can be elastically deformed via a gap between both ends. The ring member 40 is elastically attached to the tappet body 12 and is disposed so as to cover an opening of a circumferential groove 33. The ring member 40 is provided with a plurality of oil outflow holes 41 spaced apart from one another in the circumferential direction. In the illustrated case, the oil outflow holes 41 are opened to a lower end edge of the ring member 40.

According to Embodiment 4, with the rotation of the tappet body 12, the lubricating oil flowing out of the oil guide groove 31 is received by an inner peripheral surface of the ring member 40, and thereafter the lubricating oil flows out of the oil outflow holes 41 with the rotation of the tappet body 12, and can reach the cam surface 71 of the cam 70.

Thus, the lubricating oil can be reliably supplied to the cam 70. By removing the ring member 40 from the tappet body 12, the tappet of Embodiment 4 also can be used as a form of Embodiment 2.

Embodiment 5

Figure 8:
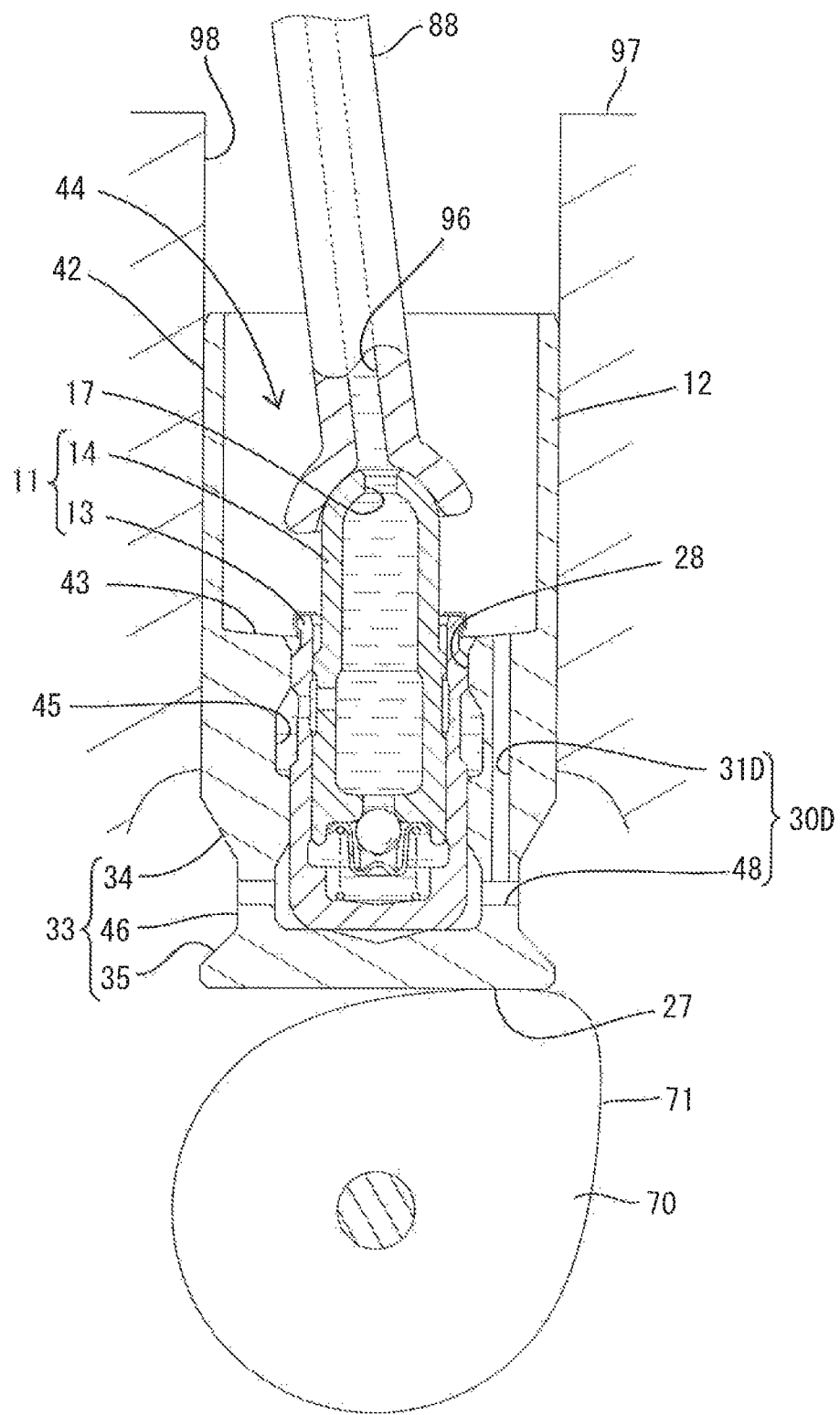
FIG. 8 is a cross-sectional view of a tappet of Embodiment 5.

FIG. 8 shows Embodiment 5 of the present invention. Although Embodiment 5 has the circumferential groove 33 similarly to Embodiment 2, an oil guide passage 30D except the circumferential groove 33 is different from that of Embodiment 2.

The tappet body 12 does not have the oil guide hole 32 of Embodiment 1 and has the oil guide passage 30D provided in a radially thick-walled portion between an assembly hole 45 of a peripheral wall 26 and an outer peripheral surface portion 42. The oil guide passage 30D has an oil guide groove 31D which extends vertically side by side with the assembly hole 45 and has an upper end opened to a receiving surface portion 43, and a communication hole 48 which intersects with a lower end of the oil guide groove 31D and penetrates the thick-walled portion of the peripheral wall 26 in a radial direction from a side surface of the assembly hole 45 to the outer peripheral surface portion 42 (here, the inner surface 46 of the circumferential groove 33). The receiving surface portion 43 of the tappet body 12 is formed to be slightly curved radially inward in a concave-curved shape.

In Embodiment 5, the lubricating oil having dropped from the push rod 88 side is received by the receiving surface portion 43, then flows from the receiving surface portion 43 into the oil guide groove 31D, then further passes sequentially from the oil guide groove 31D through the communication hole 48 and the circumferential groove 33, and can reach the cam surface 71 of the cam 70. In this case, the lubricating oil can be stored in a curved inner portion of the receiving surface portion 43 in a receiving space 44. However, the lubricating oil may not necessarily be stored in the receiving space 44, and may flow directly into the oil guide groove 31D from the push rod 88 side without via the receiving surface portion 43.

According to Embodiment 5, the lubricating oil having dropped from the push rod 88 side can be more quickly supplied to the cam surface 71 of the cam 70. Furthermore, when a lash adjuster 11 is inserted into the assembly hole 45 of the tappet body 12, the communication hole 48 can be used as an air-vent path for venting air present inside the assembly hole 45.

Embodiment 6

Figure 9:
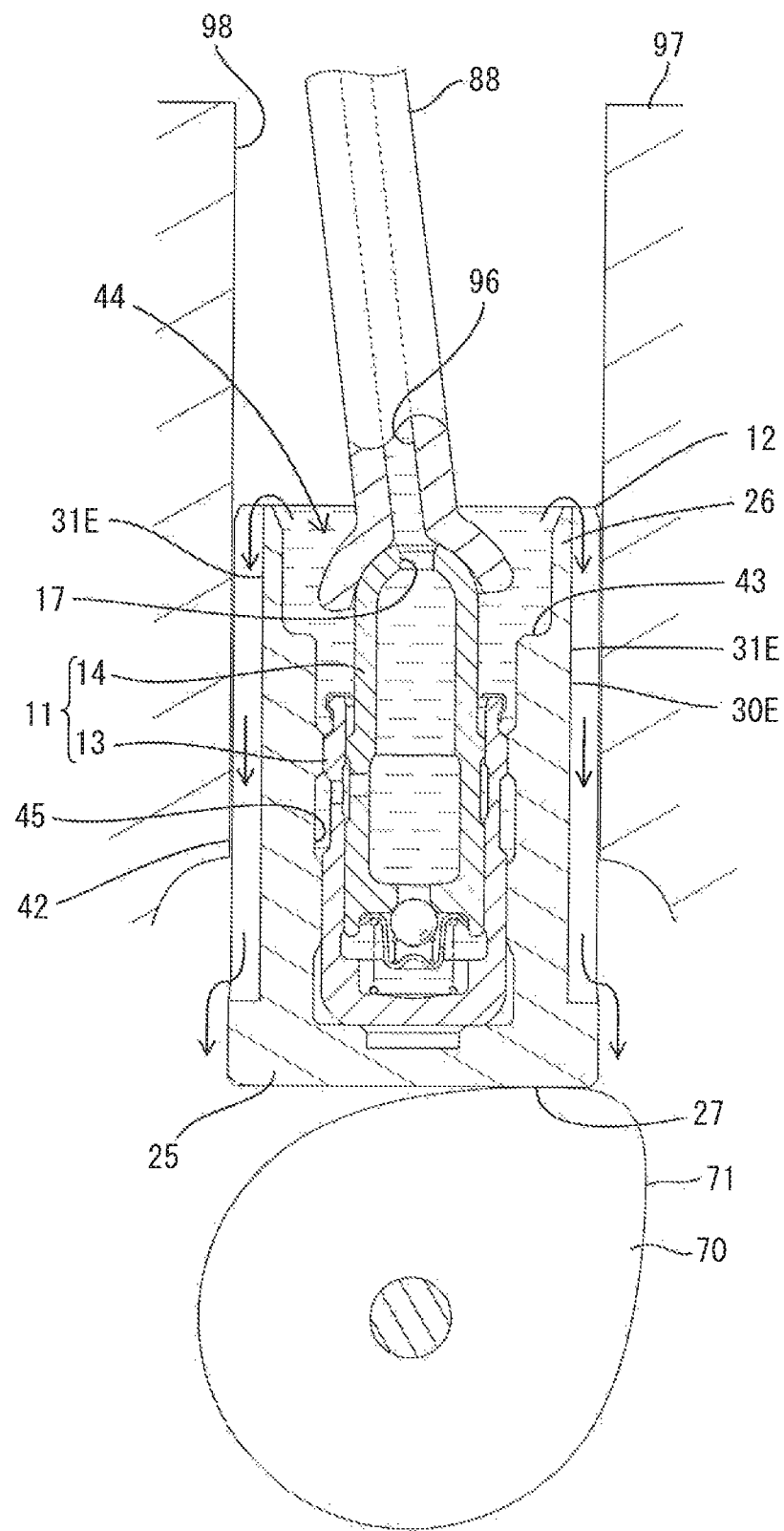
FIG. 9 is a cross-sectional view of a tappet of Embodiment 6.

FIG. 9 shows Embodiment 6 of the present invention. Embodiment 6 differs from Embodiment 1 in that the peripheral wall 26 does not include the oil guide hole 32.

In Embodiment 6, an upper portion of the peripheral wall 26 defining an outer periphery of a receiving space 44 is shorter than that of Embodiment 1. An oil guide passage 30E is constituted by oil guide grooves 31E formed in pairs in the radial direction in an outer peripheral surface portion 42 of a tappet body 12. The oil guide groove 31E extends vertically and has an upper end opened to the upper end of the peripheral wall 26 and a lower end closed at a position near the bottom wall 25.

In Embodiment 6, the lubricating oil from the push rod 88 side is stored in the receiving space 44 above the receiving surface portion 43 in a full state, then flows over the upper end of the peripheral wall 26 into the oil guide groove 31E, and can reach the cam surface 71 of the cam 70 from the oil guide groove 31E. According to Embodiment 6, it is not necessary to perform machining to bore the oil guide hole 32 in the peripheral wall 26, and in addition, the lubricating oil can be sufficiently stored in the receiving space 44.

Embodiment 7

Figure 10:
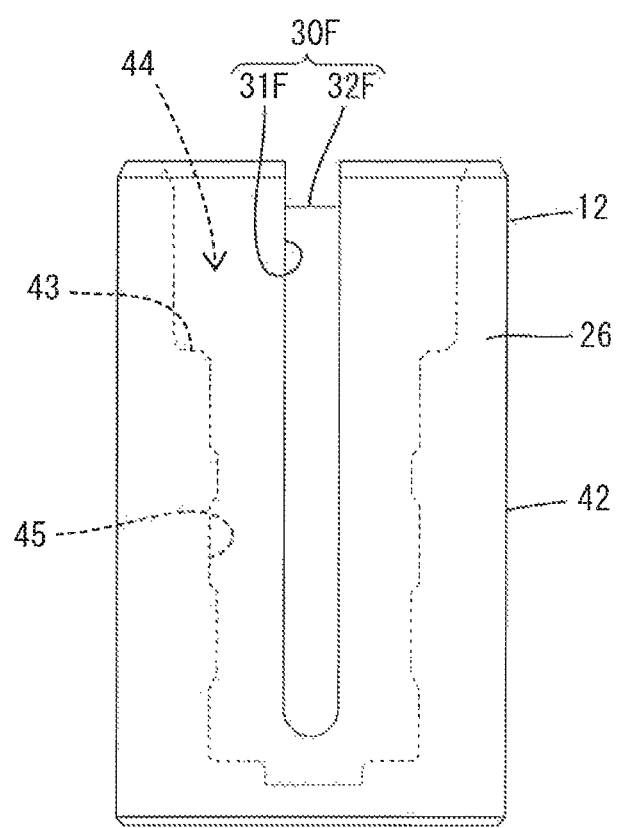
FIG. 10 is a front view of a tappet body of Embodiment 7.

FIG. 10 shows Embodiment 7 of the present invention. In Embodiment 7, a form of an oil guide passage 30F is slightly different from that of Embodiment 1.

In Embodiment 7, an oil guide hole 32F is provided so as to penetrate a thin-walled portion of a peripheral wall 26 from the receiving space 44 side to the outer peripheral surface portion 42; however, unlike Embodiment 1, the oil guide hole 32F is opened to an upper end of the peripheral wall 26. In other words, the oil guide hole 32F has a form cut out in a concave shape at the upper end of the peripheral wall 26. According to Embodiment 7, lubricating oil stored in the receiving space 44 can pass through the concave oil guide hole 32F and flow into an oil guide groove 31F. The others are the same as in Embodiment 1.

Other Embodiments

Other embodiments will be briefly described below.

(1) A roller may be interposed between a tappet body and a cam.

(2) Lubricating oil may be supplied to a tappet from an upper position where a push rod is located without flowing along an outer surface of the push rod.

(3) The ring member of Embodiment 4 may be made of resin instead of metal. Furthermore, the oil outflow hole may be opened to an upper end edge or in a central portion of the ring member.

(4) The communication hole of Embodiment 5 can be provided in the tappet bodies of Embodiments 1 to 4, 6 and 7 so as to penetrate the peripheral wall from the assembly hole to the outer peripheral surface portion.

REFERENCE SIGNS LIST

10 . . . tappet
11 . . . lash adjuster
12 . . . tappet body
13 . . . body
14 . . . plunger
30, 30A, 30B, 30D, 30E, 30F . . . oil guide passage
31, 31D, 31E, 31F . . . oil guide groove
32, 32F . . . oil guide hole
33, 33B . . . circumferential groove
35 . . . downslope
42 . . . outer peripheral surface portion
43 . . . receiving surface portion
44 . . . receiving space
45 . . . assembly hole
47 . . . retaining portion
48 communication hole
70 . . . cam
88 . . . push rod

The invention claimed is:
1. A tappet comprising:
a lash adjuster; and
a tappet body into which the lash adjuster is inserted and incorporated, wherein
the lash adjuster has a plunger having a top portion on which a lower end portion of a push rod is slidable, and a body in which the plunger is housed so as to be vertically movable,
the tappet body has
a lower surface portion which slidingly contacts a cam,
an outer peripheral surface portion which is slidable on a tappet guide,
a receiving surface portion which is located inside the outer peripheral surface portion, receives lubricating oil, and faces upward,
an assembly hole which is located inside the outer peripheral surface portion, extends vertically, and has an upper end opened to the receiving surface portion and a lower end closed, and in which the body of the lash adjuster is inserted and assembled, and
a receiving space which is located inside the outer peripheral surface portion and opened to an upside of the receiving surface portion,
the tappet body further has a bottom wall having the lower surface portion, and a peripheral wall rising upward from an outer peripheral edge of the bottom wall and having the outer peripheral surface portion,
the peripheral wall has a first-walled portion surrounding a periphery of the receiving space, and a second-walled portion surrounding a periphery of the assembly hole, wherein the first-walled portion is thinner than the second walled-portion, and
the receiving surface portion is provided on an upper surface of the second-walled portion.

2. The tappet according to claim 1, further comprising an oil guide passage located at the outer peripheral surface portion or between the outer peripheral surface portion and the assembly hole and extending so as to guide the lubricating oil received by the receiving surface portion to the cam, wherein the oil guide passage has an oil guide groove extending vertically in the outer peripheral surface portion.

3. The tappet according to claim 2, wherein the tappet body has an oil guide hole which penetrates the peripheral wall defining an outer periphery of the receiving space and communicates with an upper end portion of the oil guide groove.

4. The tappet according to claim 3, wherein the oil guide passage has a circumferential groove which is provided in a lower end portion of the outer peripheral surface portion, extends circumferentially and communicates with a lower end portion of the oil guide groove.

5. The tappet according to claim 4, wherein a lower surface of the circumferential groove is a downslope which is inclined downward from an inner surface of the circumferential groove toward outside.

6. The tappet according to claim 4, wherein the oil guide passage has a communication hole penetrating an outer peripheral portion of the assembly hole of the tappet body from a side surface of the assembly hole to the outer peripheral surface portion.

7. The tappet according to claim 3, wherein the oil guide passage has a communication hole penetrating an outer peripheral portion of the assembly hole of the tappet body from a side surface of the assembly hole to the outer peripheral surface portion.

8. The tappet according to claim 2, wherein the oil guide passage has a circumferential groove which is provided in a lower end portion of the outer peripheral surface portion, extends circumferentially and communicates with a lower end portion of the oil guide groove.

9. The tappet according to claim 8, wherein a lower surface of the circumferential groove is a downslope which is inclined downward from an inner surface of the circumferential groove toward outside.

10. The tappet according to claim 9, wherein the oil guide passage has a communication hole penetrating an outer peripheral portion of the assembly hole of the tappet body from a side surface of the assembly hole to the outer peripheral surface portion.

11. The tappet according to claim 8, wherein the oil guide passage has a communication hole penetrating an outer peripheral portion of the assembly hole of the tappet body from a side surface of the assembly hole to the outer peripheral surface portion.

12. The tappet according to claim 2, wherein the oil guide passage has a communication hole penetrating an outer peripheral portion of the assembly hole of the tappet body from a side surface of the assembly hole to the outer peripheral surface portion.

13. The tappet according to claim 1, further comprising an oil guide passage located at the outer peripheral surface portion or between the outer peripheral surface portion and the assembly hole and extending so as to guide the lubricating oil received by the receiving surface portion to the cam.

14. The tappet according to claim 13, wherein the oil guide passage has a communication hole penetrating an outer peripheral portion of the assembly hole of the tappet body from a side surface of the assembly hole to the outer peripheral surface portion.

15. The tappet according to claim 1, further comprising an oil guide passage that includes a vertically extending groove formed in the outer peripheral surface portion.

16. The tappet according to claim 15, wherein the oil guide passage further includes a circumferential groove provided in a lower end portion of the outer peripheral surface portion, and which extends circumferentially about the tappet body.

17. The tappet according to claim 1, wherein the tappet body includes a circumferential groove provided in a lower end portion of the outer peripheral surface portion, and the circumferential groove extends circumferentially about the tappet body and has a lower surface that has a downslope which is inclined downward from an inner surface of the circumferential groove to the outer peripheral surface portion.

18. The tappet according to claim 1, further comprising an oil guide hole formed in the receiving surface portion.

19. A tappet comprising:
a lash adjuster; and
a tappet body into which the lash adjuster is inserted and incorporated,
wherein
the lash adjuster has a plunger having a top portion on which a lower end portion of a push rod is slidable, and a body in which the plunger is housed so as to be vertically movable,
the tappet body has
a lower surface portion which slidingly contacts a cam,
an outer peripheral surface portion which is slidable on a tappet guide, a receiving surface portion which is located inside the outer peripheral surface portion, receives lubricating oil, and faces upward, an assembly hole which is located inside the outer peripheral surface portion, extends vertically, and has an upper end opened to the receiving surface portion and a lower end closed, and in which the body of the lash adjuster is inserted and assembled, and a receiving space which is located inside the outer peripheral surface portion and opened to an upside of the receiving surface portion, the tappet further comprises an oil guide passage located at the outer peripheral surface portion or between the outer peripheral surface portion and the assembly hole and extending so as to guide the lubricating oil received by the receiving surface portion to the cam, and the oil guide passage has an oil guide groove extending vertically in the outer peripheral surface portion, the oil guide passage has a circumferential groove which is provided in a lower end portion of the outer peripheral surface portion, extends circumferentially and communicates with a lower end portion of the oil guide groove, the tappet body has a retaining portion for retaining the lubricating oil inside the circumferential groove, and the retaining portion is constituted by a baffle portion that is provided on a lower surface of the circumferential groove of the tappet body and inclined upward from an inner surface of the circumferential groove toward outside, or the retaining portion is constituted by a ring member that is attached to the tappet body so as to cover an opening of the circumferential groove.

20. A tappet comprising:

a lash adjuster; and a tappet body into which the lash adjuster is inserted and incorporated, wherein the lash adjuster has a plunger having a top portion on which a lower end portion of a push rod is slidable, and a body in which the plunger is housed so as to be vertically movable, the tappet body has a lower surface portion which slidingly contacts a cam, an outer peripheral surface portion which is slidable on a tappet guide, a receiving surface portion which is located inside the outer peripheral surface portion, receives lubricating oil, and faces upward, an assembly hole which is located inside the outer peripheral surface portion, extends vertically, and has an upper end opened to the receiving surface portion and a lower end closed, and in which the body of the lash adjuster is inserted and assembled, and a receiving space which is located inside the outer peripheral surface portion and opened to an upside of the receiving surface portion, the tappet further comprises an oil guide passage located at the outer peripheral surface portion or between the outer peripheral surface portion and the assembly hole and extending so as to guide the lubricating oil received by the receiving surface portion to the cam, and the oil guide passage has an oil guide groove extending vertically in the outer peripheral surface portion, the tappet body has an oil guide hole which penetrates a peripheral wall defining an outer periphery of the receiving space and communicates with an upper end portion of the oil guide groove, the oil guide passage has a circumferential groove which is provided in a lower end portion of the outer peripheral surface portion, extends circumferentially and communicates with a lower end portion of the oil guide groove, the tappet body has a retaining portion for retaining the lubricating oil inside the circumferential groove, and the retaining portion is constituted by a baffle portion that is provided on a lower surface of the circumferential groove of the tappet body and inclined upward from an inner surface of the circumferential groove toward outside, or the retaining portion is constituted by a ring member that is attached to the tappet body so as to cover an opening of the circumferential groove.

\* \* \* \* \*